(12) United States Patent
Kiyohara

(10) Patent No.: US 7,487,223 B2
(45) Date of Patent: Feb. 3, 2009

(54) METHOD AND APPARATUS FOR REGENERATING MESSAGE DATA

(75) Inventor: Keith Shoji Kiyohara, Santa Monica, CA (US)

(73) Assignee: Stamps.com, Inc., Los Angeles, CA (US)

(*) Notice: Subject to any disclaimer, the term of this patent is extended or adjusted under 35 U.S.C. 154(b) by 89 days.

(21) Appl. No.: 11/407,551

(22) Filed: Apr. 19, 2006

(65) Prior Publication Data

US 2006/0265460 A1    Nov. 23, 2006

Related U.S. Application Data

(63) Continuation of application No. 09/691,791, filed on Oct. 18, 2000, now Pat. No. 7,065,554.

(51) Int. Cl.
*G06F 15/16* (2006.01)

(52) U.S. Cl. .................. 709/217; 709/206; 707/10

(58) Field of Classification Search ......... 709/206–207, 709/226, 217; 707/7, 10
See application file for complete search history.

(56) References Cited

U.S. PATENT DOCUMENTS

| | | | |
|---|---|---|---|
| 4,831,555 A | 5/1989 | Sansone et al. | |
| 4,900,903 A | 2/1990 | Wright et al. | |
| 4,900,904 A | 2/1990 | Wright et al. | |
| 4,908,770 A | 3/1990 | Breault et al. | |
| 5,111,030 A | 5/1992 | Brasington et al. | |
| 5,454,038 A | 9/1995 | Cordery et al. | |
| 5,884,032 A * | 3/1999 | Bateman et al. | 709/204 |
| 5,903,877 A * | 5/1999 | Berkowitz et al. | 705/26 |
| 5,948,054 A * | 9/1999 | Nielsen | 709/200 |
| 6,134,582 A * | 10/2000 | Kennedy | 709/206 |
| 6,249,807 B1 * | 6/2001 | Shaw et al. | 709/206 |
| 6,356,633 B1 * | 3/2002 | Armstrong | 379/265.11 |
| 6,424,966 B1 * | 7/2002 | Meyerzon et al. | 707/3 |
| 6,442,592 B1 * | 8/2002 | Alumbaugh et al. | 709/206 |
| 6,442,600 B1 * | 8/2002 | Anderson | 709/217 |
| 6,449,260 B1 * | 9/2002 | Sassin et al. | 370/270 |
| 6,449,646 B1 * | 9/2002 | Sikora et al. | 709/226 |
| 6,480,599 B1 * | 11/2002 | Ainslie et al. | 379/265.02 |
| 6,549,906 B1 * | 4/2003 | Austin et al. | 707/10 |
| 6,557,003 B1 * | 4/2003 | Powers | 707/102 |
| 6,609,138 B1 * | 8/2003 | Merriam | 707/204 |
| 6,625,139 B2 * | 9/2003 | Miloslavsky et al. | 370/352 |
| 2002/0122543 A1 * | 9/2002 | Rowen | 379/93.01 |
| 2003/0046291 A1 * | 3/2003 | Fascenda | 707/10 |
| 2003/0191799 A1 * | 10/2003 | Araujo et al. | 709/203 |
| 2003/0208608 A1 * | 11/2003 | Merriam | 709/229 |

* cited by examiner

*Primary Examiner*—Salad Abdullahi
(74) *Attorney, Agent, or Firm*—The Hecker Law Group, PLC

(57) ABSTRACT

A system for regenerating electronic mail, e.g., when a certain event transpires. If, for instance, a server program has previously sent the user an electronic mail message, that electronic mail message may be regenerated and retransmitted to the user or provided to support personnel upon request.

9 Claims, 12 Drawing Sheets

FIG. 5

METHOD AND APPARATUS FOR REGENERATING MESSAGE DATA

CROSS-REFERENCE TO RELATED APPLICATIONS

This application is a continuation of U.S. patent application Ser. No. 09/691,791, filed Oct. 18, 2000, the specification and drawings of which are herein incorporated by reference in their entirety.

BACKGROUND OF THE INVENTION

1. Field of the Invention

This invention relates in general to the field of electronic mail processing and more particularly to a method and apparatus for regenerating electronic mail.

2. Background Art

Electronic mail messaging (email) is the prime means of communication used to provide customer service support by most Internet based businesses. Customers use email to request information from (or deliver information to) the company's customer service representatives (CSR). Email is also used by the company's electronic systems to communicate without human intervention with customers. Companies that use electronic mail (email) to provide customer service usually need to keep a historical log of all the correspondence between the company's online system and the customers. Such correspondences must be stored in a manageable way so as to enable any entity representative (e.g. a customer service representative) to find information in the historical data.

FIG. 1a illustrates the basics of email communication with a client. Customer 100 carries out all email communication through Internet 110. On the company side, an email server processes the inbound email communications. In some instances, past correspondence is needed to assist customers with specific requests. Current systems provide for company personnel to obtain such correspondence by storing each and every email message sent to or received from a customer. Each email message is copied from the server to an email management system 130 attached to a storage device 140.

Storing copies of all email messages and processing them to manage the information is a burdensome task and presents many drawbacks. Historical storage takes up considerable space, whether online or in hard copy, and it is often difficult to retrieve the exact information, in a timely manner as required for a particular customer.

Information must be drawn from stored email messages, which necessitates parsing the stored email messages and finding cues, such as users email addresses and subject contents, in order to sort and group correspondences by topics. This approach is error prone, since customers may use different email addresses to communicate about any given topic, or use different subject content when corresponding about the same topic. To improve the parsing accuracy, a commonly used technique is the use of unique identifiers. Unique identifiers are, for example, numbers attached to each new email message. By keeping the same number in all subsequent emails, it is possible to track a posteriori all related email messages. This method is still prone to inaccuracies; since customers may use same unique numbers for different topics, for example if the customer uses the "reply" functionality, present in many modern email clients, the subject line will include the content of the subject, including any unique identifier.

In addition to shortcomings in parsing email messages, storing a big volume of data is costly in terms of hardware storage media, and in terms of search and processing time. Thus, there is a need for a system that overcomes the limitations of current system by providing for efficient storage and processing of electronic mail data. For example, the is a need for a system that provides a way to regenerate electronic message data without having to store each and every message that is transmitted.

SUMMARY OF THE INVENTION

In one embodiment, the invention comprises a system for regenerating electronic mail. If, for instance, a server program previously sent the user an electronic mail message, that electronic mail message may be regenerated by an embodiment of the invention and retransmitted to the user or provided to support personnel upon request. Thus, the invention provides a mechanism for regenerating previously generated message data. Such message data is typically generated in response to a triggering event. The user initiates the triggering event in one embodiment of the invention, but such an event may also be generated in response to command initiated by any individual having a need to obtain an instance of the previously transmitted message data. For example, any individual associated with the entity that is to transmit the message (e.g., by customer support, technical support, etc. ... ) may initiate a triggering event. The technique utilized to regenerate messages may also be utilized to initially generate messages that are to be transmitted.

Once a triggering event occurs, the system obtains a template associated with the type of triggering event that occurred. Thus, each triggering event may have a type that is related to a particular template. Each template may comprise information related to a particular transaction or activity engaged in by the user (e.g., a customer). Once the template information is obtained, the system accesses the user's account record to obtain information specific to that user. This user specific information is combined with the template information to generate a personalized message that responds to the triggering event. Once the message is generated it can be transmitted to the user for display.

Once the system transmits the message generated using the template to the user, the system saves data associated with that message in the historical data file (e.g., a log file, text file, and/or any type of database). In one embodiment of the invention such data comprises a portion of the original message data. The historical data file may contain, for example, data utilized to populate the template with information that applies specifically to the user that received the message data. The template data common among all messages of a certain type may be excluded from the data residing in the historical data file. The historical data file may contain information that provides the reason the message was initially transmitted. Thus, the data file may comprise information that identifies why the message was transmitted and what event the message was transmitted in response to. The data file may also include a template ID that identifies which template to utilize.

In one embodiment of the invention, the system comprises a regeneration module configured to retrieve and restore the historical records of each user's transaction and correspondence upon request. If, for example, a duplicate of the initial message is requested, another instance of the previously generated message may be created.

If a request for a previously transmitted message is initiated, the system obtains the record of the user whom the message was transmitted to on a prior occasion. The user information is extracted from the user record and the relevant template is identified and populated with information from the user record. The populated template is then utilized to re-create a new instance (e.g., an electronic mail message) of a previously transmitted message. Thus, the system can reformulate any message transmitted to a particular user on a prior occasion. For example, the system may reformulate messages initially transmitted to the user when the user registers, or when an existing customer makes a purchase or requests a credit for a previous purchase. However, in one embodiment of the invention, the system may regenerate any type of message data (e.g., text, sound, video, etc . . . ) previously transmitted to the user. Such message data may comprise data associated with an online or offline transaction and may comprise text, sound, video and/or any other type of digital information.

In accordance with one embodiment of the invention, the new message instance provides representatives of the entity that transmitted the original message with a copy of the message to review. Thus, the entity representatives may utilize the invention to determine what kind of message data has already been communicated to the user and utilize this message to assist the user. The entity representative may, for example, elect to transmit a new instance of the message data to the user so as to provide the user with another copy of the message.

BRIEF DESCRIPTION OF THE DRAWINGS

These and other features, aspects and advantages of embodiments of the invention will become better understood with regard to the following description, appended claims and accompanying drawings where:

FIG. 5 illustrates a detailed view of the user account information in accordance with one embodiment of the invention.

DETAILED DESCRIPTION OF THE INVENTION

Figure 1A:
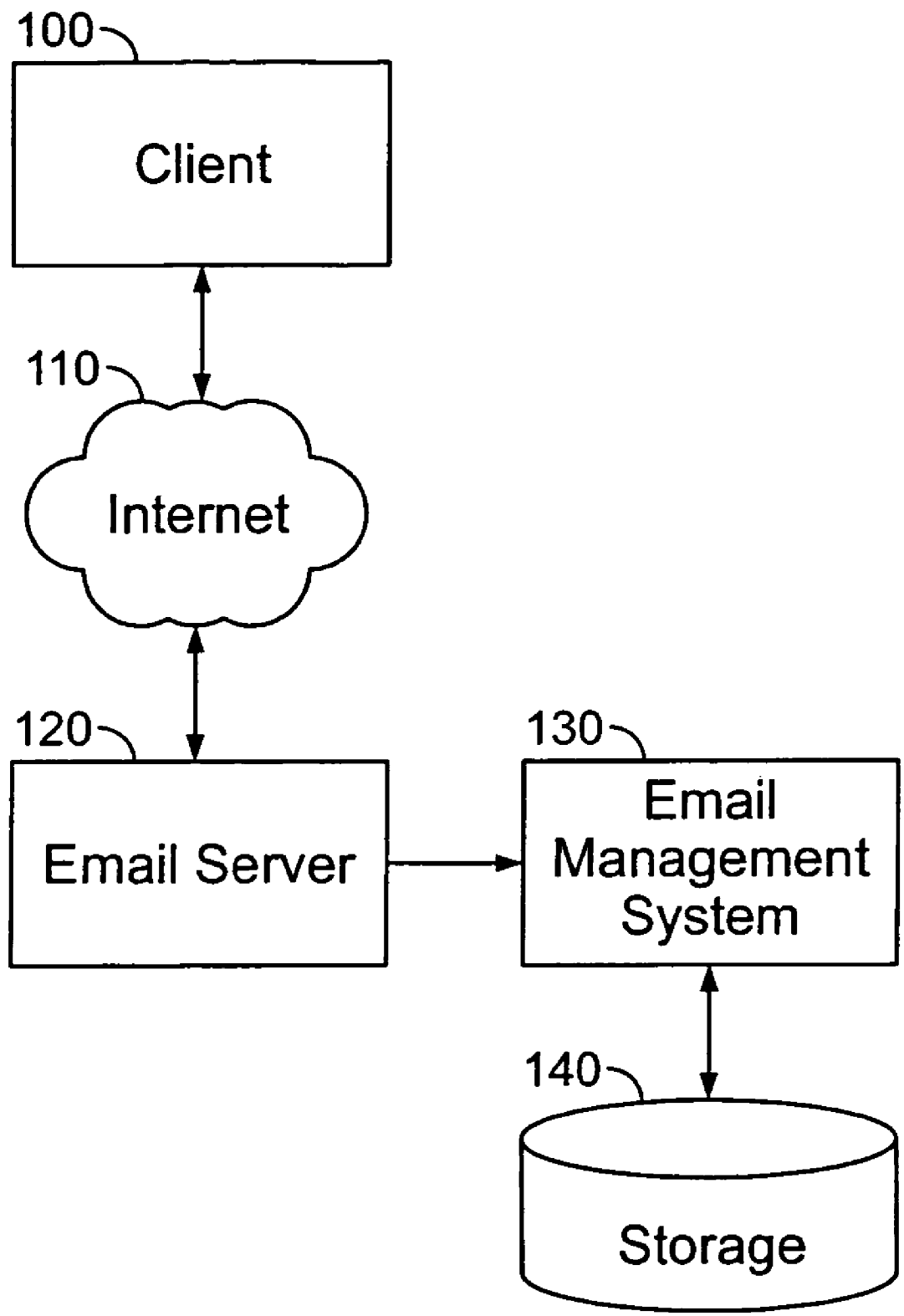
FIG. 1a comprises an example of a current system for processing electronic mail messages.

In one embodiment, the invention comprises a system for regenerating electronic mail. If, for instance, a server program has previously sent the user an electronic mail message, that electronic mail message may be regenerated by an embodiment of the invention and retransmitted to the user or provided to support personnel upon request.

In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

In order to provide adequate service to users, it is helpful for the individuals (or entities) who provide such services to have access to information previously communicated to the users. For example, technical support personnel or any other individual that represents the a particular entity can more expediently help a user solve a particular issue when the individual has access to the history of messages that have already been communicated to the user. Such historical information may comprise customer information, account status information, transaction information, prior correspondence, electronic mail messages, notes about previous conversations, recordings of prior conversations, and/or any other type of information containing information relevant to the issue the user is inquiring about. This historical information (or any other type of information sent to the user) may be regenerated and provided to the entity representative or the user for information purposes. Regenerating previously stored messages provides the capability to optimally store such historical information. In one embodiment of the invention, the system stores only the applicable information that appeared on the initial email template and not the entire email message. The specific information contained in the body of the email message may be stored in the Name Value Pairs field (See e.g., SentLog table described below for the fields and descriptions that are saved in the message data file.) For example, the Name Value pairs may contain information such as the balance remaining in the user's account, information about a credit card charge, or the amount of a particular purchase (e.g., the purchase of online postage).

An embodiment of the invention provides the capability to immediately store and accurately retrieve historical information. For example, an embodiment of the invention may store final calculations as they initially appeared on the original message. The system is therefore not required to recalculate or reprocess the data when it is requested again. All the data is calculated the first time the email is created and sent to the customer. The calculated values are stored in the message data file and then retrieved on demand to display in the regenerated message. The data stored in the data file may be stored immediately (or a some time interval) after the system sends the message to the customer, so the values are the current and accurate. The system does not have to recalculate information on historical values so there is less chance of error and the regenerated email information is reliable.

With existing system entity representatives (e.g., Customer Support Representative) have difficulty relocating information previously provided to a customer. It can take an unreasonable amount of time to search through the entire system and find the exact information in question. Problems arise when information is stored in different data files and the system must retrieve, process and display information from different data files. If a system searches through and extracts data from multiple data files, it is much slower than searching for and extracting data from only one data file.

Using the message regeneration feature in accordance with one embodiment of the invention solves these problems. The system implementing an embodiment of the invention may store all the transactional data for the customer and the required template information in the same data file. When the entity representative wants to review an email message, the system goes only to one data file and quickly extracts and displays the correct data in the correct template and regenerates the requested email.

Figure 1B:
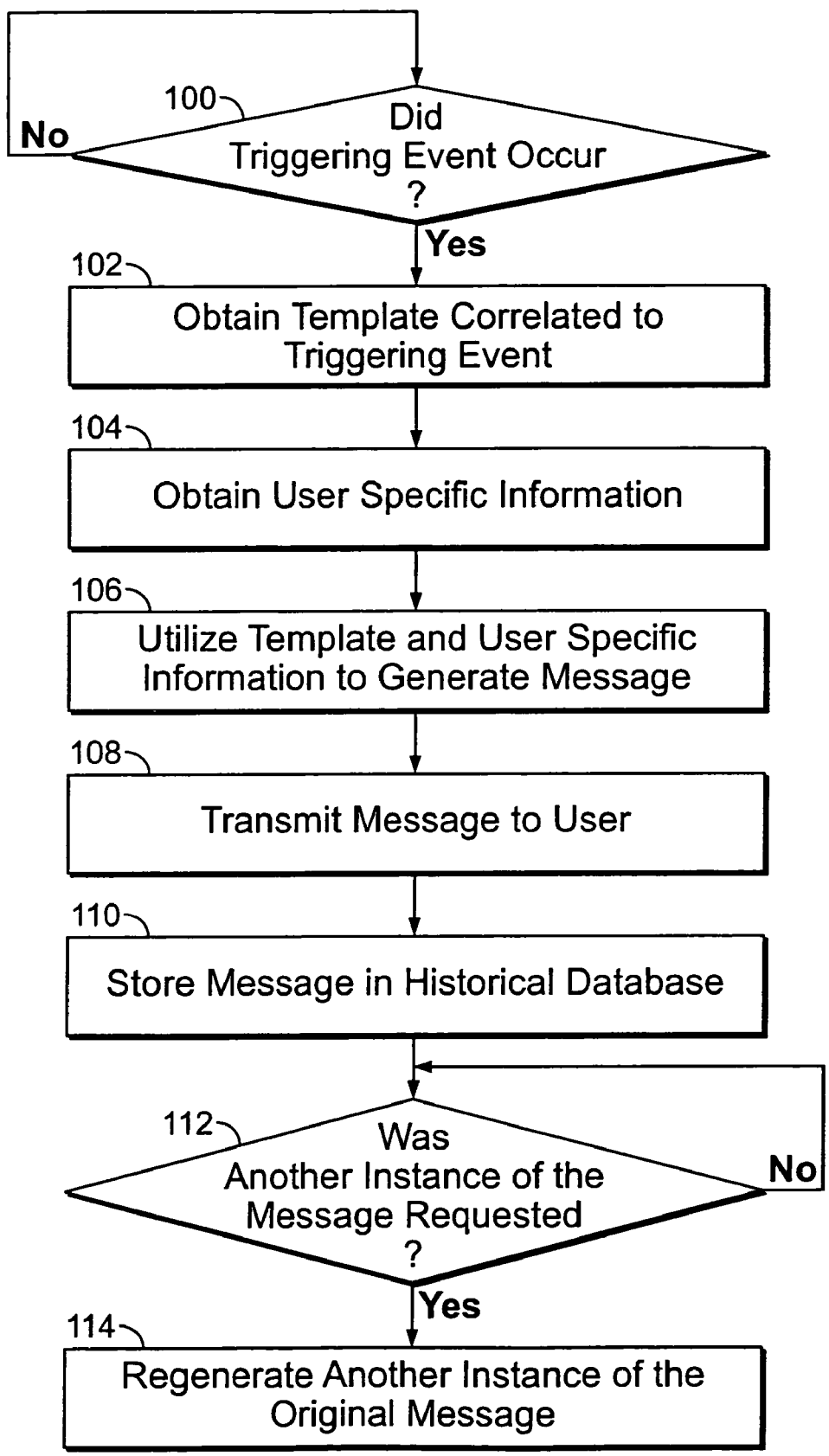
FIG. 1b comprises a flow chart illustrating the process utilized by an embodiment of the invention to generate and then subsequently regenerate message data transmitted to a user.

System Overview:

An embodiment of the invention provides messaging services to an entity that transmits message data (e.g., electronic mail messages) to a plurality of users. Such message data is typically generated in response to a triggering event. The triggering event is initiated in one embodiment of the invention by the user, but such events may also be generated in response to a command initiated by any entity associated with the transmitted message (See e.g., FIG. 1b, step 100). A triggering event may comprise any type of event complemented by the transmission of a message subsequent to the event. For example, a triggering event may comprise a technical support request, a customer service request, an account status inquiry, a service inquiry, a general information request, and/or any other type of inquiry.

The triggering event may also comprise a certain task or command initiated by the receiving user and/or the user who operates the system. For example, when a user performs certain tasks using a client program and the user wishes to receive confirmation of that task, a triggering event may be initiated. The system is designed in such a way that triggering events may be defined as any type of event where information is accepted from the user. For example, if a user purchases goods and/or services the purchase acts as a triggering event for the transmission of a message confirming the transaction.

In one embodiment of the invention, when a triggering event occurs the system obtains a template associated with the triggering event (e.g., at step 102). The system may be provided with access to a variety of templates. Each template comprises information associated with one or more triggering events. For instance, each template may contain information related to a particular transaction or activity engaged in by the user. The system may contain a template that, for example, provides the user with confirmatory information, order information, purchase information, registration information, technical support information, and/or any other information related to an action (or inaction) of the user.

Once the template information is obtained, the system accesses the user's account record to obtain information specific to that user (e.g., at step 104). This user specific information is combined with the template information to generate a personalized message that responds to the triggering event (e.g., at step 106). Any calculations or processor intensive operations may performed at this step. Once the message is generated it can be transmitted to the user (e.g., at step 108).

Simultaneous with transmission of the electronic mail message to the user, the server may store data extracted from or associated with the message in a historical data file. In one embodiment of the invention such data comprises a portion of the original message data. For example, the result of any calculations made while the message was being generated may be stored in the historical data file. In one embodiment of the invention, the historical data file comprises user specific and general data (e.g., template data). The user specific data comprises information unique to the particular message that was sent (e.g., the personalized data). Such data may be associated with a particular user (e.g. user name, account information, electronic mail address, user account balance, and/or any other information associated with the user).

The general data may comprise the template information utilized to initially generate the message. The template information typically comprises general information not specifically related to a particular customer. The template data that is common to all messages of a certain type may be excluded from the data residing in the historical data file. In some instances, the entire contents of the template as well as the information added to the template is stored in the historical data file.

Such information may be utilized by an embodiment of the invention to represent the message previously transmitted to the user. The historical data file thereby comprises the transaction information contained in previously transmitted messages. The historical data file may also contain other information needed to regenerate the message using minimal processing activity (e.g., calculated data). The specific details stored in the historical data file in accordance with one embodiment of the invention are displayed below in the sentlog table. However, the historical data file may contain other information related to the message that was transmitted.

In one embodiment of the invention, the system comprises a regeneration module configured to retrieve and restore the historical records of each customer's transaction and correspondence upon request. At step 112, an embodiment of the invention determines if another instance of the original message was requested. If a duplicate of the initial message is requested, step 114 executes and a duplicate of the message is created.

Figure 2:
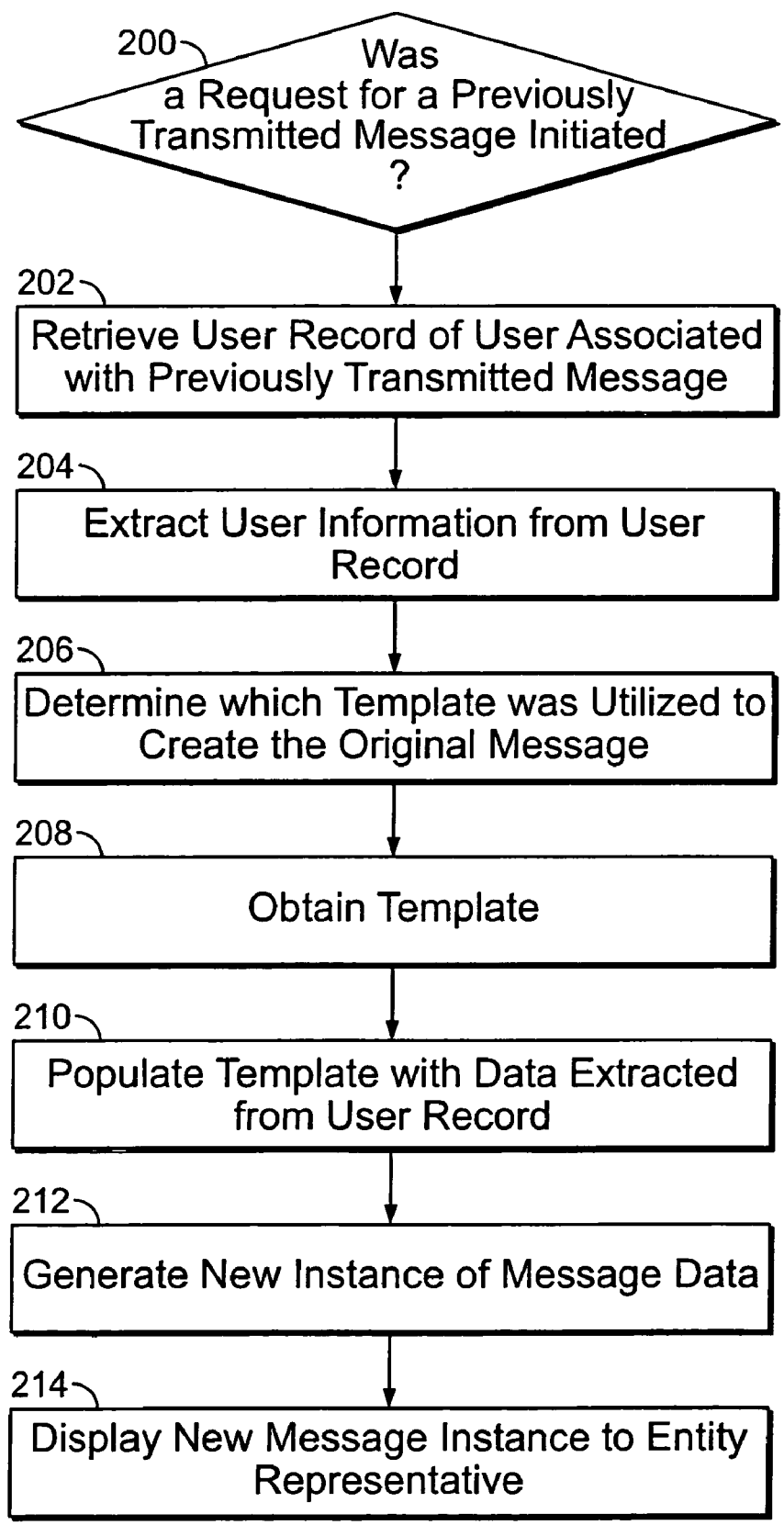
FIG. 2 illustrates the process utilized by an embodiment of the invention to regenerate an instance of a previously transmitted message.

FIG. 2 illustrates the process utilized by an embodiment of the invention to regenerate or duplicate an instance of a previously transmitted message. The message regeneration process initiates when the user or a representative tasked with helping the user initiates a request for a previously transmitted message. Thus, at step 200, an embodiment of the invention determines if a request for a previously transmitted message was initiated (e.g., does request exist in sentlog). If such a request was initiated, the system obtains the record of the user whom the message was transmitted to on a prior occasion (e.g., at step 202). At step 204, user information is extracted from the user record. Once the user information is obtained, the system determines which template was utilized to generate the original message (e.g., at step 206).

The system then obtains the proper template file (e.g., at step 208) and populates the template (e.g., at step 210) with the information extracted from a record associated with the user. This record may contain previously calculated information, user specific information, and/or general information which comprises previously calculated information, user specific information and/or any other type of data related to the message. Once the record is accessed, the populated template is then utilized to re-create a new instance (e.g., a electronic mail message) of a previously transmitted message. Thus, the system can reformulate any message transmitted to a particular user on a prior occasion. For example, the system may reformulate messages initially transmitted to the user when the user registers, or when an existing customer makes a purchase or requests a credit for a previous purchase. However, in one embodiment of the invention, the system may regenerate any type of message data (e.g., text, sound, video, etc. . . . ) transmitted to the user on a prior occasion. Such message data may comprise data associated with an online or offline transaction and may comprises text, sound, video and/or any other type of digital information.

In accordance with one embodiment of the invention, the new message instance provides representatives of the entity that transmitted the original message with a copy of the message to review. Thus, the entity representative can determine what kind of message data has already been communicated to the user and utilize this message to assist the user. The entity representative may, for example, elect to transmit the new instance of the message data to the user so as to provide the user with another copy of the message.

If, the user has any questions or issues regarding the status of an item confirmed via email, the entity representative may utilize an embodiment of the invention to lookup the user's account history data. The account history data comprises a listing by title, subject, or category of the electronic mail messages previously transmitted to the user. If the entity representative wishes to review one or more of the messages on the list the representative may select the message title that causes the system to regenerate the message and display the result to the representative for review (e.g., at step 214).

In one embodiment of the invention, the title of the message (or some other icon or text representative of the message) comprises a link (e.g., a hyperlink or button). When the link is selected, a page comprising a new instance of the message previously sent to the user is displayed. The message may be regenerated utilizing the information contained in the historical data file. The email regeneration feature of the system provides an accurate, reliable and immediate recreation of the original electronic mail message as it was sent to the user.

The electronic mail message is typically regenerated whenever an authorized user initiates a request for another instance of the message. In one embodiment of the invention, the message is recreated using the same template and data values present in the original message. Thus, the system comprises an archived copy of each template that may be transmitted to users.

The invention also contemplates an embodiment where the system tracks different versions of the template files. Version control management may be performed at a database which modifies the database tables accordingly. For example, the TemplateMap table and TemplateURL tables may be modified to manage version information. The TemplateURL table tracks instances of new templates that have been generated. The TemplateURL table may have a template ID and a template URL which points to an actual template file. When a new version is created a new template ID and an associated TemplateURL is added to the TemplateURL table. The TemplateMap table may comprise two different fields. The first field tracks types of template files (e.g., welcome message, confirmation) the second field tracks the template ID (e.g., template ID 1) associated with that template message type. When a new template is added to the TemplateURL table the TemplateMap table is modified to reflect that update.

In one embodiment of the invention, the system utilizes a template to generate and regenerate electronic mail messages, thus the system is not typically required to store the entire contents of each previously transmitted message. Instead, the system store data that is specific to the customer and utilizes the template to obtain other information pertinent to the message that is to be generated. Thus, an embodiment of the invention provides a mechanism for regenerating message data associated with a particular user without necessitating the storage of such information.

FIGS. 3-7 provide an example of the interfaces displayed to the entity representative in order to regenerate a message previously transmitted to a particular user. The interfaces shown here are for example purposes only. The invention contemplates the use of graphical user interfaces and other types of interfaces (e.g., command line) that contain more or less information than what is illustrated in FIG. 3-7.

Figure 3:
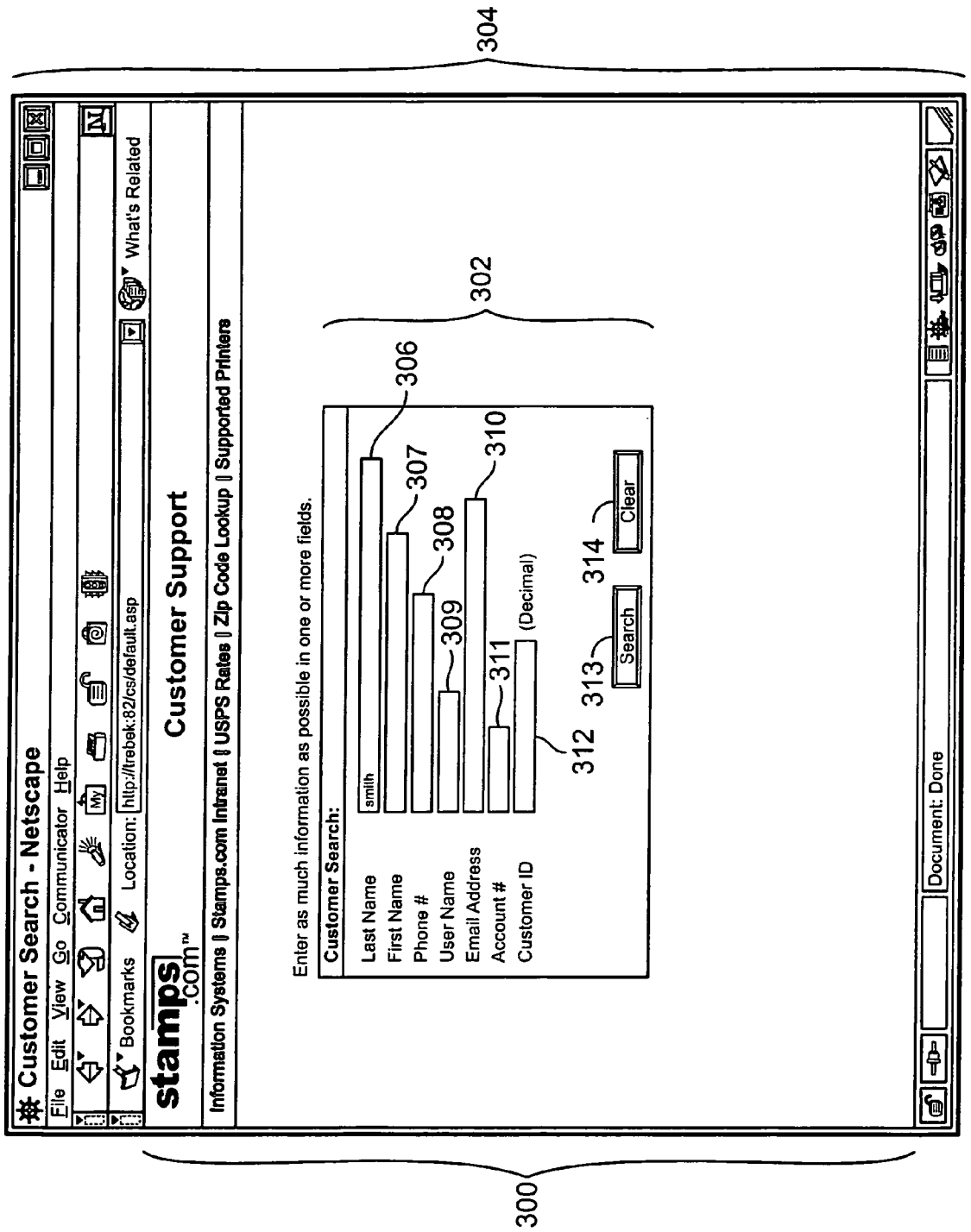
FIG. 3 illustrates the interface utilized by an entity representative to locate messages associated with a particular user in accordance with one embodiment of the invention.

FIG. 3 illustrates the interface utilized by an entity representative (e.g., customer support) to locate messages associated with a particular user. Interface 300 may be embedded in any type of client or server based program (e.g., browser 304). In one embodiment of the invention, interface 300 comprises a search window 302 that contains locations 306-312. The entity representative may utilize locations 306-312 to define search criteria. For example, search parameters such as a last name, first name, phone number, user name, email address, account number, customer ID, or any other identifying information may be entered in locations 306-312. The entity representative may clear the information contained in locations 306-312 by selecting clear button 314. Once the entity representative has placed information in at least one of the search locations, the entity representative may select search button 313. When search button 313 is selected, the historical data file is queried for information contained in the search parameters. The results of the search query are returned in results window 400.

Figure 4:
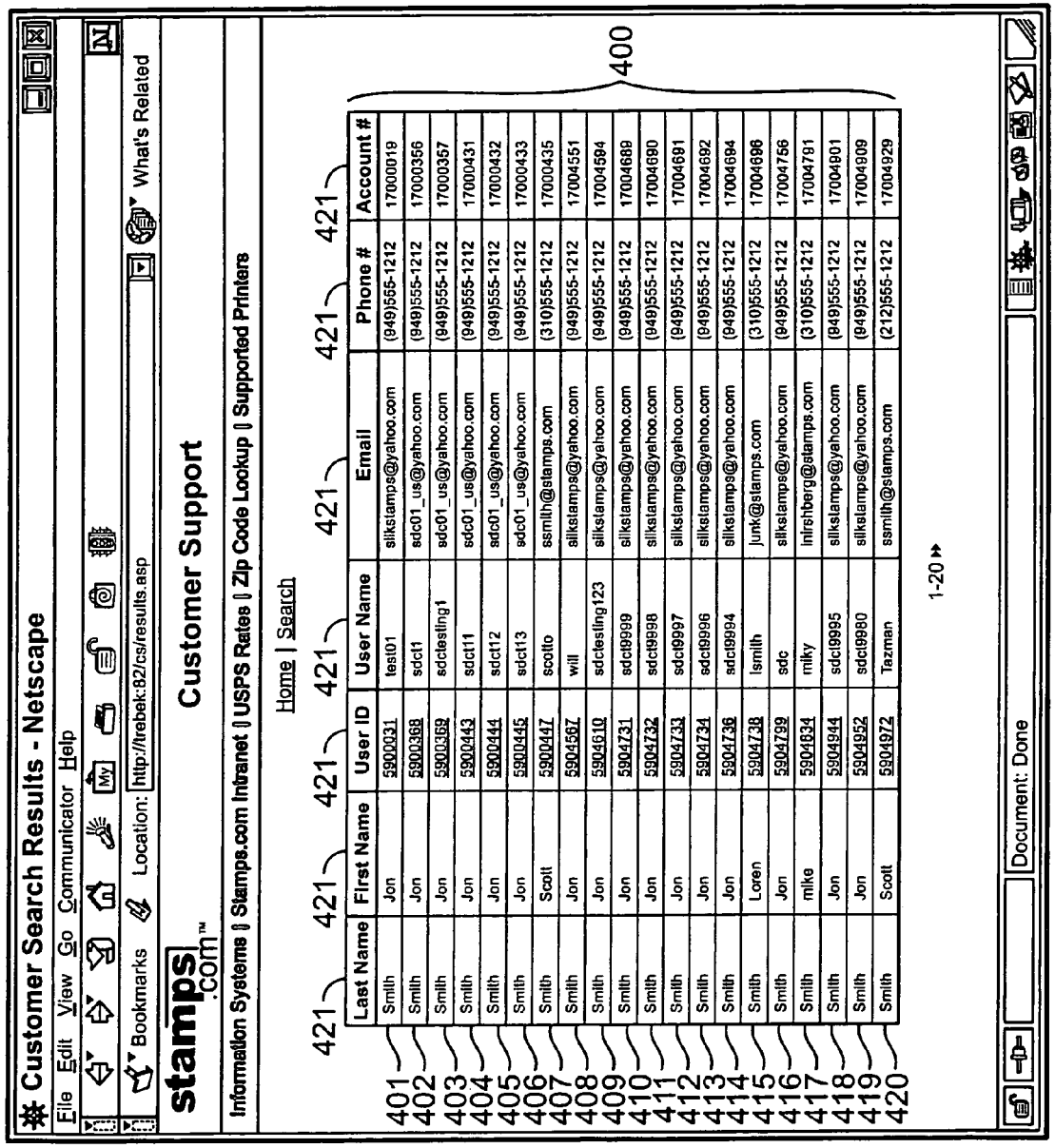
FIG. 4 illustrate the search results interface in accordance with one embodiment of the invention.

FIG. 4 illustrates the search results window in accordance with one embodiment of the invention. Search results window 400 comprises a list of possible matches generated from the query submitted when search button 313 was selected. If, for example, the searching user (e.g., the entity representative) entered a search parameter that indicated the last name was "smith", results 401-420 would be displayed. Each result 401-420 comprises data that matches the search parameter that was entered. Each result displays user information 421 (e.g., name, user ID, user name, email, phone number, account number, and/or other information about the user in search results window 400. The entity representative may select one of the results or a portion of the result (e.g., the user ID) to obtain further information about that particular record.

Figure 5:
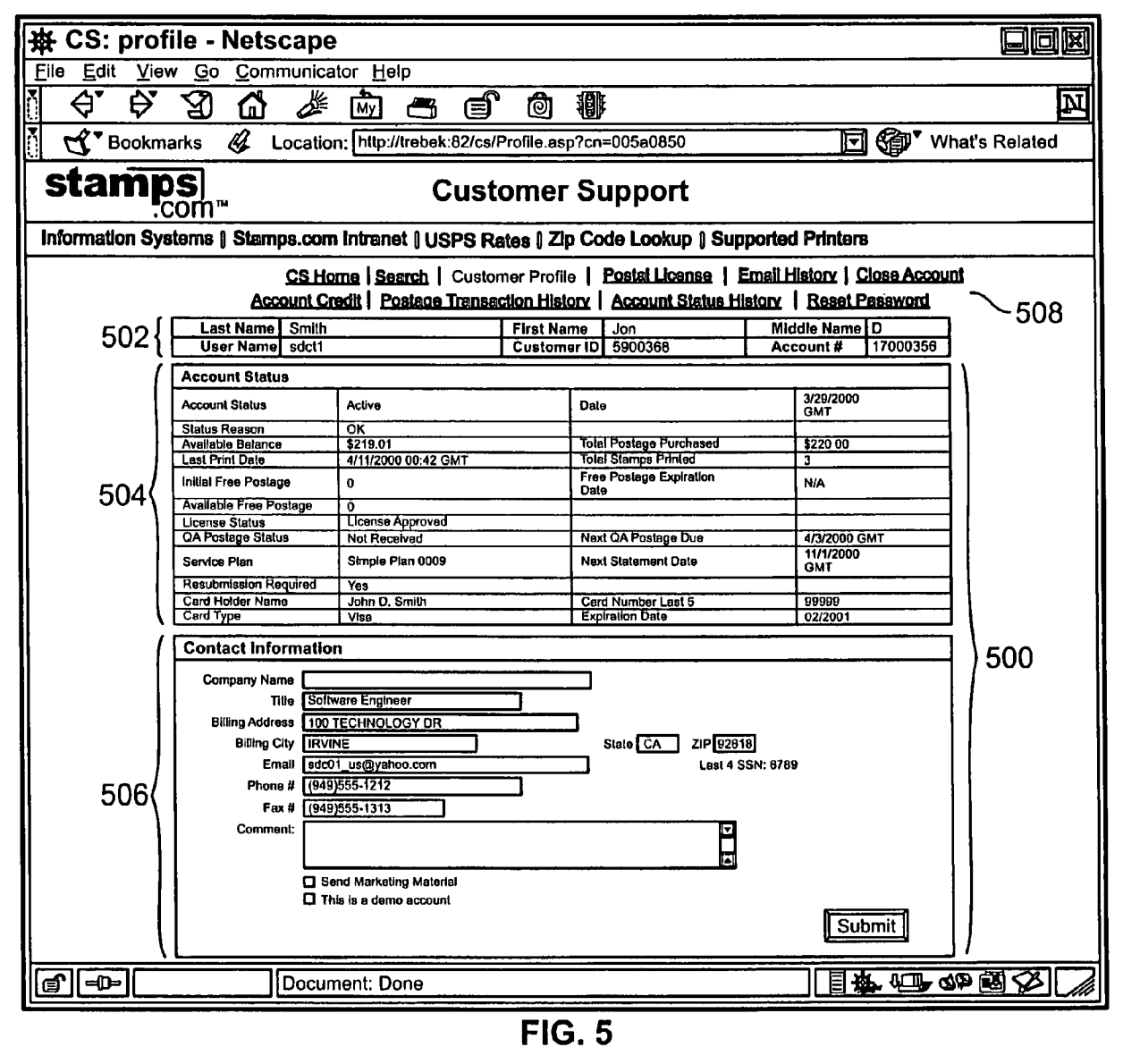

FIG. 5 illustrates a detailed view of the user account information in accordance with one embodiment of the invention. The account details for the selected user appear in user profile window 500. User information header 502 comprises data that uniquely identifies the user (e.g., the user's last name, first name, middle name, user name, customer ID, and account number). User profile window 500 comprises account status information 504 and contact information 506.

To review email messages, the entity representative may select Message history link 508 at the top of the window. Upon selection of the Message history link a list of the messages (e.g., electronic mail messages) previously transmitted to the selected user appear in a message history window.

Figure 6:
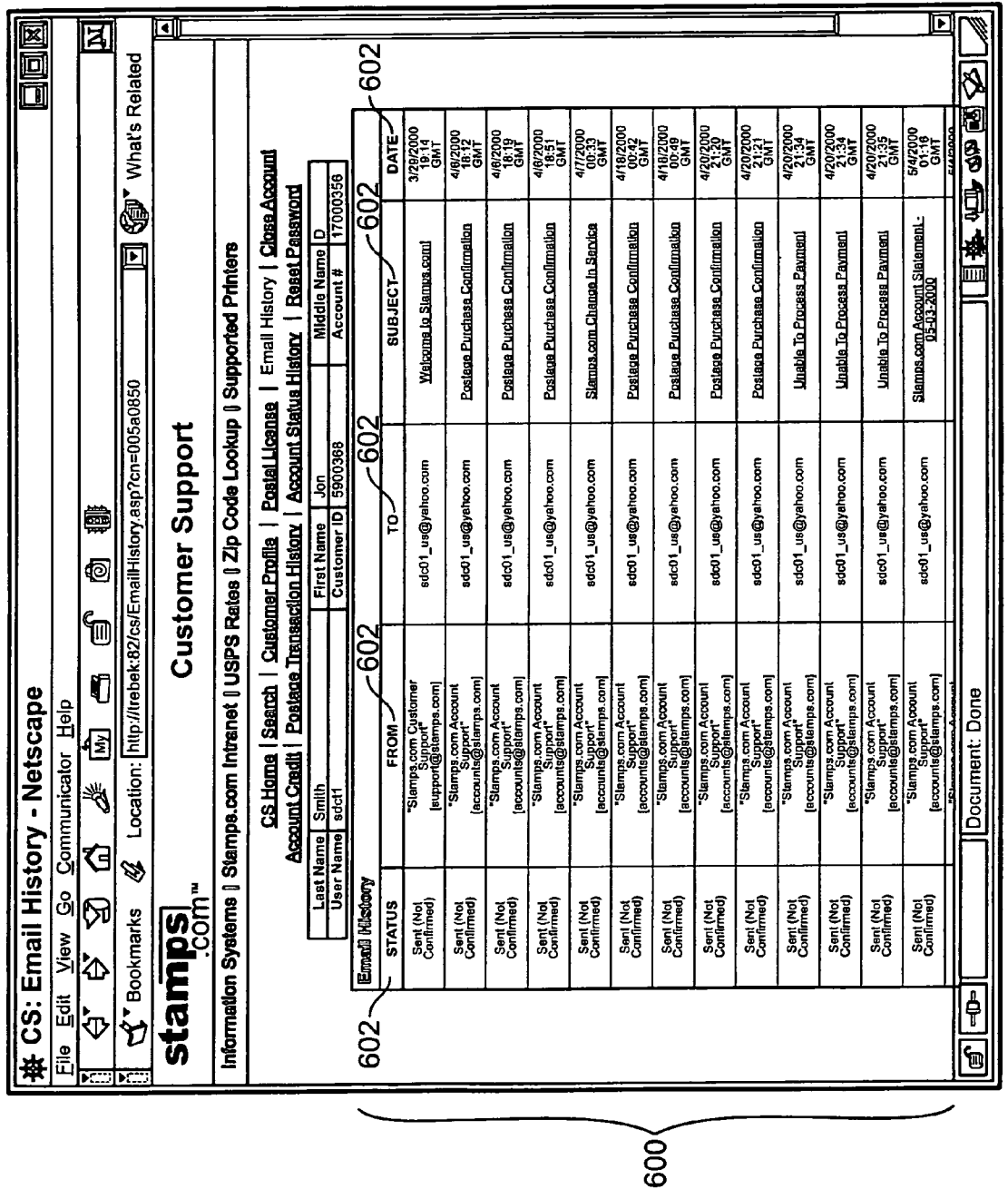
FIG. 6 illustrates a message history interface in accordance with an embodiment of the invention.

FIG. 6 illustrates a message history interface in accordance with an embodiment of the invention. Message history interface 600 comprises a list of messages sent to the user (e.g., the customer on a prior occasion). Each entry in the list comprises identifying information 602. The invention contemplates different types of identifying information 602. Each piece of identifying information is typically provided in order to aid the entity representative in locating or identifying the contents of the message. However, identifying information 602 may be provided for other purposes. In accordance with one embodiment of the invention, identifying information 602 comprises information associated with a previously transmitted message (e.g., an electronic mail). In this instances identifying information comprises a status field, a from field, a to field, a subject field, a date filed, and/or any other filed that has information useful to the searching user (e.g., the entity representative). The status field indicates whether the message was sent and if so whether confirmation of the transmission of the message was ever received. The status filed may, for example, contain text stating the message was "sent (not confirmed)".

The from field indicates the originating party. Thus, the from field may contain the name or electronic mail address associated with the party who initially transmitted the message (e.g., "Customer Support—support@stamps.com or Technical Support—techsupport@stamps.com"). The to field comprises an address associated with the user that received the message. The subject field identifies what the subject of the transmitted message was and the date field indicates the date the message was sent.

Figure 7:
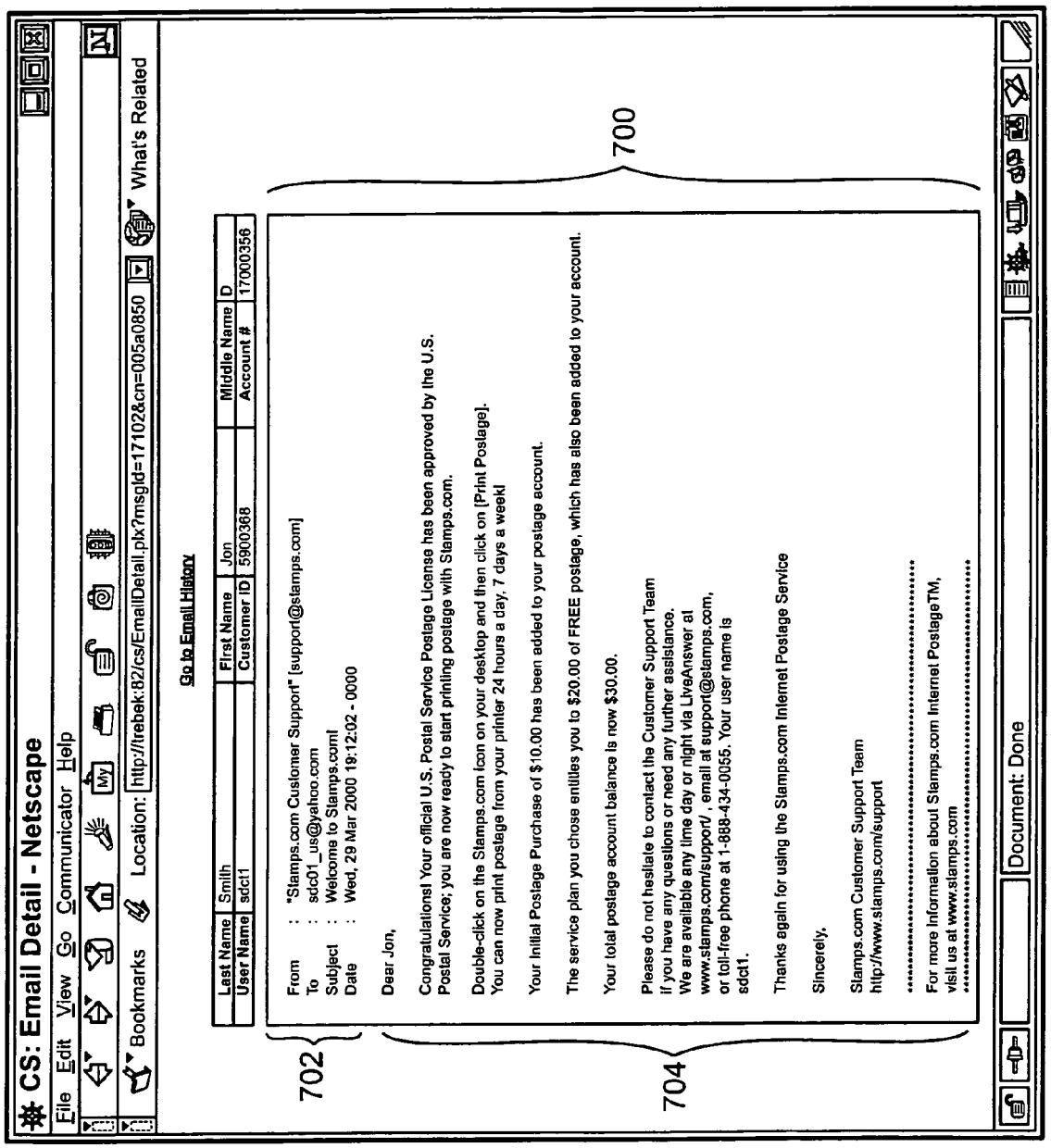
FIG. 7 comprises an illustration of a message that was previously transmitted to the user and subsequently regenerated by the system in accordance with one embodiment of the invention.

When the user (e.g., the entity representative) identifies a particular message that is to be regenerated (e.g., by selecting a portion of the identifying information) the system provides a new instance of the message. FIG. 7 comprises an illustration of a message that was previously transmitted to the user and subsequently regenerated by the system. The message shown in FIG. 7 is for example purposes only. It is important to note that an embodiment of the invention may be utilized to generate and then subsequently regenerate any type of message. The message shown in FIG. 7 comprises a "welcome" message 700 that was transmitted to the user when the user initially registered for a service provided by the entity associated with transmitting message 700. Certain portions of this "welcome" message 700 are generated using information from one or more template files whereas other portions of the "welcome" message 700 are extracted from one or more user records. In one embodiment of the invention message 700 comprises header portion 702 and body portion 704. Header portion 702 contains the addressing information (e.g., from, to, subject, date) and body portion contains text or some other type of data.

In one embodiment of the invention, the "welcome" message shown in FIG. 7 was regenerated using the template utilized to initially create the message and the data values stored in the historical data file at the time the message was initially generated. The original data values for the message shown comprise:

date and time the email was initially created
  To: name
  From: name
  subject: title of the email message
  customer's name
  initial postage purchase amount
  amount of free postage due this customer This information is combined with the template data and utilized to generate a second instance of the message for use by the entity representative. The entity representative may utilize the message for informational purposes or elect to transmit the message to the user. If the entity representative wishes to obtain another message (e.g., a different type), the representative may go back to the Message history interface and select another message for display.

Figure 8:
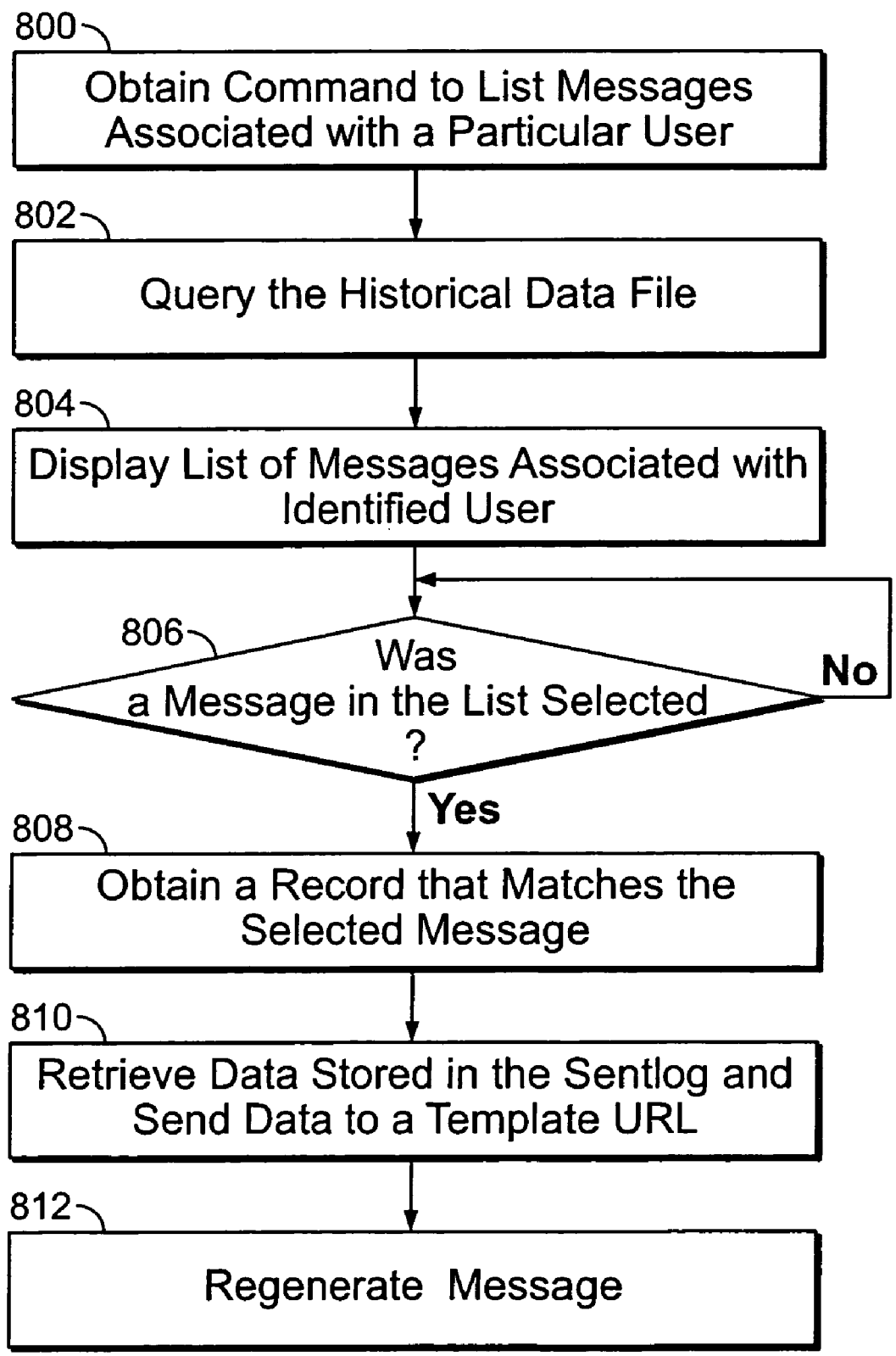
FIG. 8 illustrates the process utilized by an embodiment of the invention to generate a new instance of message.

System Level Description:

When the entity representative views the Message history list an embodiment of the invention utilizes the process illustrated in FIG. 8 to generate a new instance of the selected message. The process begins at step 800 when the entity representative (or some other user) initiates a command to obtain a list of messages associated with a particular user ID. Once the system obtains the command, the system executes step 802 where it queries the historical data file (e.g., the sentlog table in the message data file) and then displays (e.g., at step 804) a list of all email messages that correspond to the selected User ID. In one embodiment of the invention, the command request is transmitted through a web server and an ASP is utilized to generate the list of messages that are to be displayed. The ASP is configured to display the list of messages that apply only to the selected user.

Once the message list is generated, the entity representative locates the message and chooses a particular message (e.g., by selecting a portion of the message). At step 806, the system determines if the user has selected a message contained in the list. When a message is not selected, the system waits for a selection or exits. If a message identified in the list is selected the system obtains a record that matches the selected message (e.g., at step 808) from the sentlog table. The following table illustrates the contents of the sentlog table (e.g., sentlog 904) in accordance with one embodiment of the invention.

| Sentlog Table | |
| --- | --- |
| Field | Description |
| Cust ID | customer identification number |
| TemplateURLID | identification number for the URL that displays a specific version of the template |
| SentNVPairs | Sent Name Value Pairs - the personalized data for the selected customer that appears in the email template. The data is stored in the table as a string of text, up to 7168 characters long. |
| Status | status of the customer account |
| DateSent | date and time the initial email message was sent |
| DateServerReceipt | date the destination SMTP server received the message (currently not used) |
| DateReadReceipt | date the destination user opened the message (currently not used) |
| MsgFrom | sender of the message as appeared in the From: field in the email. |
| MsgTo | recipient of the message as appeared in the To: field in the email. |
| MsgSubject | subject of the email as appeared in the Subject: field in the email. |
| MsgID | identification number of the email message. |

In one embodiment of the invention the matching record contains information from the sentlog table. A script of computer program (e.g., a PERL script, JAVA program, or any other type of computer readable program code) may be utilized to pick the matching record from the sentlog table. The matching record may contain, for example, the following information:

Customer ID
  Template URL ID
  Data string from in the template fields
  Status of account
  Date/time when email was originally sent
  Send to: email address
  To: email address
  Email subject;
  Message ID The system then executes step 810 where it retrieve the data stored in the sentlog and sends it to a template URL. The template URL is mapped to a template ID and name. The following table shows the TemplateURL table (e.g., Template URLs 901) layout in accordance with one embodiment of the invention.

| TemplateURL Table | |
| --- | --- |
| Field | Description |
| TemplateURL-ID (902) | Identification number for the URL for a specific template |
| URL | URL pointing to a template file. |

Templates are periodically updated and the system is configured to use the most recently updated version. However, in some instances other template versions are utilized. If, for example, a message was generated using an template that is no longer flagged as active, but that template still contains information relevant to the transaction, the system may utilize an out-of-date template.

Figure 9:
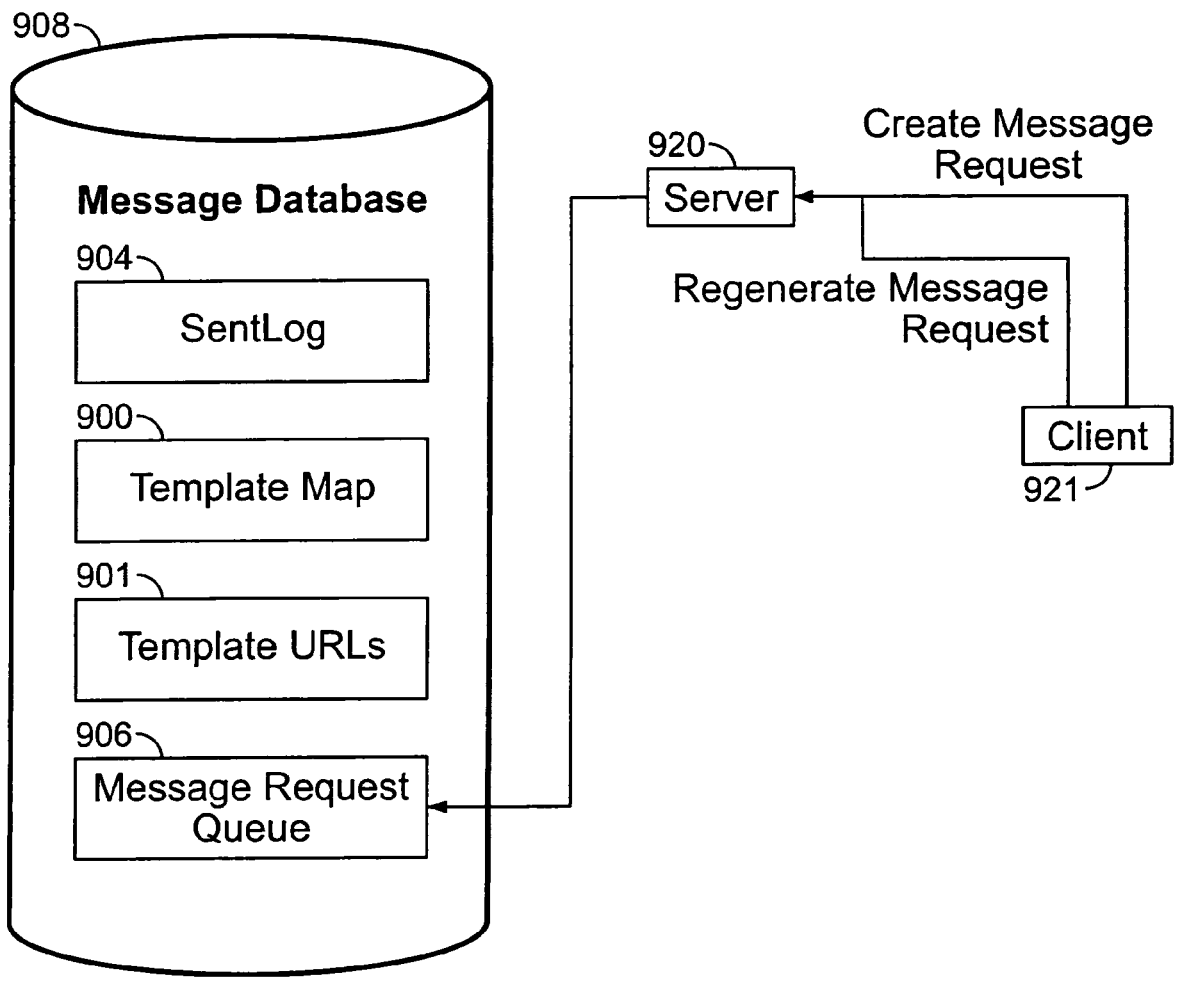
FIG. 9 illustrates the data flow for creating and regenerating messages in accordance with one embodiment of the invention.

FIG. 9 illustrates the data flow for creating and regenerating messages in accordance with one embodiment of the invention. MessageRequest Queue 906 comprises a list of message requests initiated by client 921 and sent via server 920. A request may comprises a regenerate message request or a create message request. An illustration of the information contained in TemplateMap 900 follows.

TemplateMap Table

| Field | Description |
|---|---|
| TemplateType | Template identification number |

When the data (e.g., customer/user data) is sent to the template, the system generates (or regenerates) the message using the matching data and the template data (e.g., at step 812). In one embodiment of the invention, the text of the message and sends XML data back to the program that located the match (e.g., the Perl code). However, the invention also contemplates the use of separate programs that pass parameters between one another to implement an embodiment of the invention and is not limited solely to XML. For example, the invention may be implemented using any type of programming language capable of storing template and user information. A sample of the XML data that represents the "welcome" message discussed above follows:

```
<?xml version="1.0" ?>
<xmlStampsMessage>
    <xmlMessageFrom>"Stamps.com Customer Support"
        <support@stamps.com></xmlMessageFrom>
    <xmlMessageTo>sdc01_us@yahoo.com</xmlMessageTo>
    <xmlMessageSubject>Welcome to
        Stamps.com!</xmlMessageSubject>
    <xmlMessageDate>Wed, 29 Mar 2000 19:12:02 -
        0000</xmlMessageDate>
    <xmlMessageBody>Dear Jon, Congratulations! Your official U.S.
        Postal Service Postage License has been approved by the U.S.
        Postal Service; you are now ready to start printing postage with
        Stamps.com. Double-click on the Stamps.com icon on your
        desktop and then click on [Print Postage]. You can now print
        postage from your printer 24 hours a day, 7 days a week! Your
        initial Postage Purchase of $10.00 has been added to your
        postage account. The service plan you chose entitles you to
        $20.00 of FREE postage, which has also been added to your
        account. Your total postage account balance is now $30.00.
        Please do not hesitate to contact the Customer Support Team if
        you have any questions or need any further assistance. We are
        available any time day or night via LiveAnswer at
        www.stamps.com/support/, email at support@stamps.com, or
        toll-free phone at 1-888-434-0055. Your user name is sdct1.
        Thanks again for using the Stamps.com Internet Postage service!
        Sincerely, Stamps.com Customer Support Team
        http://www.stamps.com/support
        ***************************************************
        ****** For more information about Stamps.com Internet
        PostageTM, visit us at www.stamps.com
        ***************************************************
        ******</xmlMessageBody>
    <xmlPropertyLog>
        <xmlNVPair>getMessageDate=Wed, 29 Mar 2000 19:12:02 -
            0000</xmlNVPair>
        <xmlNVPair>getCustProp.UserName=sdct1</xmlNVPair>
            <xmlNVPair>getRequestItem.strMeterAmount=$30.00</
                xmlNVPair>
        <xmlNVPair>getRequestItem.shopper_id=005a0850-
            000001f4</xmlNVPair>
        <xmlNVPair>getOrderFormProp.bill_now=1000</xmlNVPair>
            <xmlNVPair>getRequestItem.strFreePostageAmt=$20.00</
                xmlNVPair>
        <xmlNVPair>getCustProp.FirstName=Jon</xmlNVPair>
        <xmlNVPair>getRequestItem.cn=005a0850</xmlNVPair>
            <xmlNVPair>getCustProp.eMailAddress=
                sdc01_us@yahoo.com</xmlNVPair>
    </xmlPropertyLog>
    <xmlTemplateErrorCode>0</xmlTemplateErrorCode>
</xmlStampsMessage>
```

The program that accepts the XML data then reformats the XML to a format that can be readily displayed to the user (e.g., HTML, SGML, Javascript, or any other language that can be utilized to display data). Once the XML is reformatted it may be displayed to the entity representative that selected the message from the list in the first instance.

Figure 10:
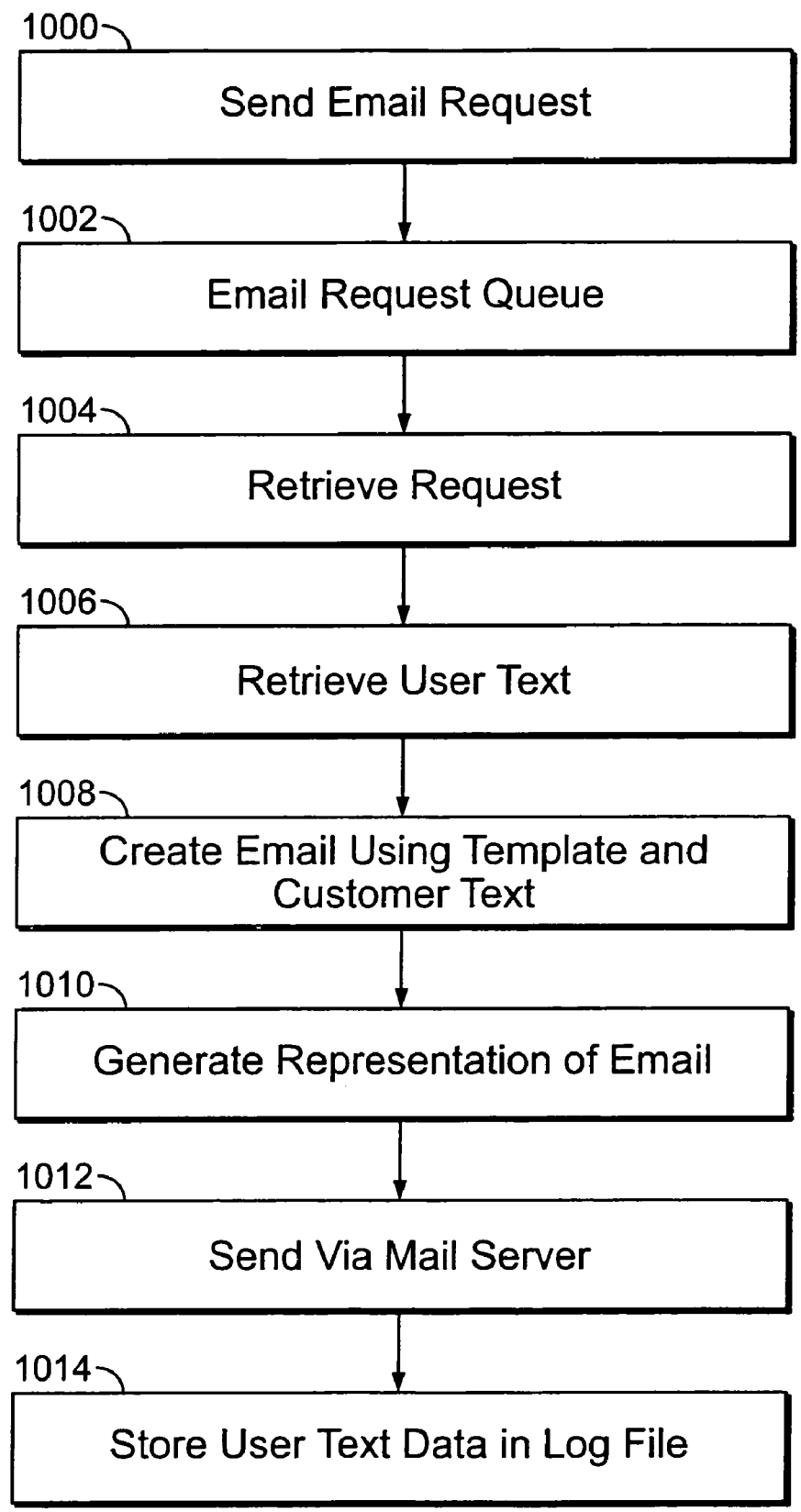
FIG. 10 illustrates a more detailed version of the system flow utilized to generate an electronic mail message in accordance with one embodiment of the invention.

FIG. 10 illustrates a more detailed version of the system flow utilized to generate an electronic mail message in accordance with one embodiment of the invention. The process initiates when the user requests the message (e.g. at step 1000). The message may be directly or indirectly requested. For example, the user may explicitly ask to receive a certain type of information (a direct request) or the message may be generated as part of a transaction (e.g., when the user registers or makes some type of inquiry). An indirect request may also comprise messages initiated by a third-party and/or messages that are automatically transmitted at certain intervals (e.g., listserv messages and or email subscription services). Once the request is sent, step 1002 executes. At step 1002, the request is stored in an email request queue. At step 1004, the request is retrieved from the email database and processing of the request is initiated. At step 1006, the text associated with a specific user ID is retrieved from the user records. Once the text is retrieved, the email is generated using the customer text data and a template file (e.g., at step 1008). In one embodiment of the invention, a representation of the email is generated (e.g., at step 1010). For example, an XML file may be created utilizing the template data and the customer text data. The email representation is then transmitted to a mail server (e.g., at step 1012) where it is forwarded using SMTP or some other data transport protocol. The information that is sent is stored in one embodiment of the invention in a log file (e.g., the sentlog file). However, the data may be stored in any file that is arranged to hold historical information.

Embodiment of Computer Execution Environment

Figure 11:
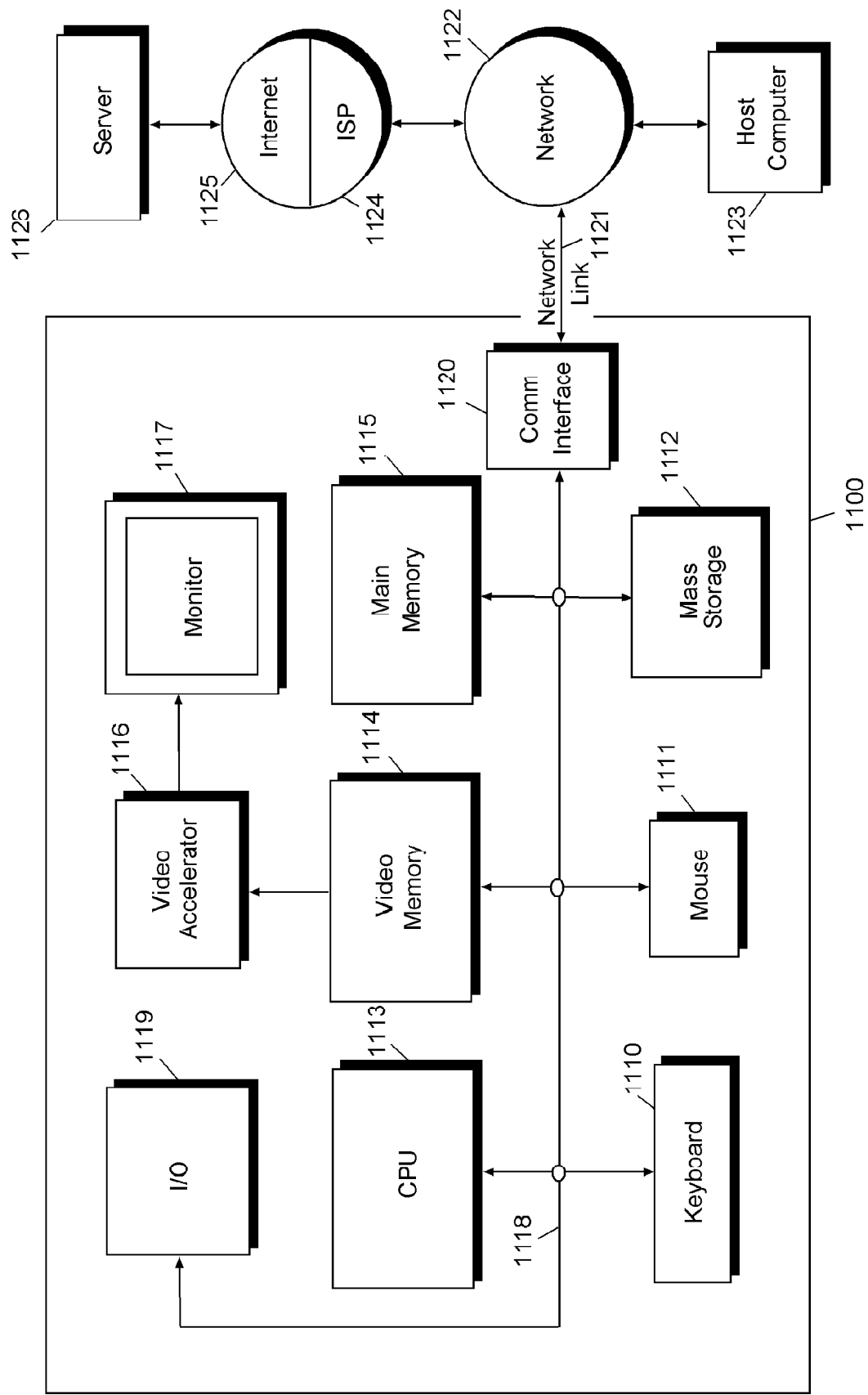
FIG. 11 illustrates a general hardware environment configured to execute an embodiment of the invention.

An embodiment of the invention can be implemented as computer software in the form of computer readable program code executed on one or more general-purpose computers such as the computer 1100 illustrated in FIG. 11. A keyboard 1110 and mouse 1111 are coupled to a bidirectional system bus 1118 (e.g., PCI, ISA or other similar architecture). The keyboard and mouse are for introducing user input to the computer system and communicating that user input to central processing unit (CPU) 1113. Other suitable input devices may be used in addition to, or in place of, the mouse 1111 and keyboard 1110. I/O (input/output) unit 1119 coupled to bidirectional system bus 1118 represents possible output devices such as a printer or an A/V (audio/video) device.

Computer 1100 includes video memory 1114, main memory 1115, mass storage 1112, and communication interface 1120. All these devices are coupled to a bidirectional system bus 1118 along with keyboard 1110, mouse 1111 and CPU 1113. The mass storage 1112 may include both fixed and removable media, such as magnetic, optical or magnetic optical storage systems or any other available mass storage technology. The system bus 1118 provides a means for addressing video memory 1114 or main memory 1115. The system bus 1118 also provides a mechanism for the CPU to transferring data between and among the components, such as main memory 1115, video memory 1114 and mass storage 1112.

In one embodiment of the invention, the CPU 1113 is a microprocessor manufactured by Motorola, such as the 680X0 processor, an Intel Pentium III processor, or an UltraSparc processor from Sun Microsystems. However, any other suitable processor or computer may be utilized. Video memory 1114 is a dual ported video random access memory. One port of the video memory 1114 is coupled to video accelerator 1116. The video accelerator device 1116 is used to drive a CRT (cathode ray tube), and LCD (Liquid Crystal Display), or TFT (Thin-Film Transistor) monitor 1117. The video accelerator 1116 is well known in the art and may be implemented by any suitable apparatus. This circuitry converts pixel data stored in video memory 1114 to a signal suitable for use by monitor 1117. The monitor 1117 is a type of monitor suitable for displaying graphic images.

The computer 1100 may also include a communication interface 1120 coupled to the system bus 1118. The communication interface 1120 provides a two-way data communication coupling via a network link 1121 to a network 1122. For example, if the communication interface 1120 is a modem, the communication interface 1120 provides a data communication connection to a corresponding type of telephone line, which comprises part of a network link 1121. If the communication interface 1120 is a Network Interface Card (NIC), communication interface 1120 provides a data communication connection via a network link 1121 to a compatible network. Physical network links can include Ethernet, wireless, fiber optic, and cable television type links. In any such implementation, communication interface 1120 sends and receives electrical, electromagnetic or optical signals which carry digital data streams representing various types of information.

The network link 1121 typically provides data communication through one or more networks to other data devices. For example, network link 1121 may provide a connection through local network 1122 to a host computer 1123 or to data equipment operated by an Internet Service Provider (ISP) 1124. ISP 1124 in turn provides data communication services through the world wide packet data communication network now commonly referred to as the "Internet" 1125. Local network 1122 and Internet 1125 both use electrical, electromagnetic or optical signals that carry digital data streams to files. The signals through the various networks and the signals on network link 1121 and through communication interface 1120, which carry the digital data to and from computer 1100, are exemplary forms of carrier waves for transporting the digital information.

The computer 1100 can send messages and receive data, including program code, through the network(s), network link 1121, and communication interface 1120. In the Internet example, server 1126 might transmit a requested code for an application program through Internet 625, ISP 1124, local network 1122 and communication interface 1120.

The computer systems described above are for purposes of example only. An embodiment of the invention may be implemented in any type of computer system or programming or processing environment. When a general-purpose computer system such as the one described executes the process and process flows described herein, it is configured to provide a mechanism for regenerating message data.

Thus, a method and apparatus for regenerating message data has been described. Particular embodiments described herein are illustrative only and should not limit the present invention thereby. The claims and their full scope of equivalents define the invention.

What is claimed is:

1. An apparatus comprising:
computer storage media comprising:
a plurality of templates, each of said templates associated with one of a plurality of standardized communications;
a plurality of files respectively associated with a plurality of customers, each of said files comprising:
one or more references to one or more templates used in one or more prior communications with a respective customer;
information specific to said respective customer;
a server configured to regenerate said one or more prior communications with said respective customer by:
obtaining one or more previously used templates based on said one or more references;
populating said one or more previously used templates with data from said information specific to said respective customer, wherein said server is further configured to respond to a triggering event by:
obtaining a triggered tern plate associated with a type of said triggering event, said triggered template comprising standardized information associated with said triggering event;
generating a triggered electronic mail message by populating said triggered template with data from a given file of a customer associated with said triggering event; transmitting said triggered electronic mail message to said customer; and storing a reference to said triggered template in said given file.

2. The apparatus of claim 1, wherein said server is further configured to provide regenerated prior communications to a requester.

3. The apparatus of claim 2, wherein said requester is a customer service representative.

4. The apparatus of claim 1, wherein said information specific to said respective customer comprises customer account information.

5. The apparatus of claim 1, wherein said information specific to said respective customer comprises customer transaction information.

6. The apparatus of claim 1:
wherein said information specific to said respective customer comprises a prior electronic mail message from said respective customer;
wherein said plurality of templates further comprises a mail display template; and
wherein said server is further configured to obtain said mail template and populate said mail template with said prior electronic mail message.

7. The apparatus of claim 1:
wherein said information specific to said respective customer comprises text data from one or more notes associated with said respective customer;
wherein said plurality of templates further comprises a note display template; and
wherein said server is further configured to obtain said note display template and populate said note display template with said text data.

8. The apparatus of claim 1:
- wherein said information specific to said respective customer comprises audio data of a prior conversation with said respective customer;
- wherein said plurality of templates further comprises an audio playback interface template; and
- wherein said server is further configured to obtain said audio playback interface template and associate said audio playback interface template with said audio data.

9. The apparatus of claim 1:
- wherein said information specific to said respective customer comprises calculated data from a prior communication; and
- wherein said server is further configured to use said calculated data to populate said one or more previously used templates.

* * * * *